Dec. 23, 1941.  M. E. JORDAN  2,266,764
COMBINE
Filed May 6, 1940    2 Sheets-Sheet 1
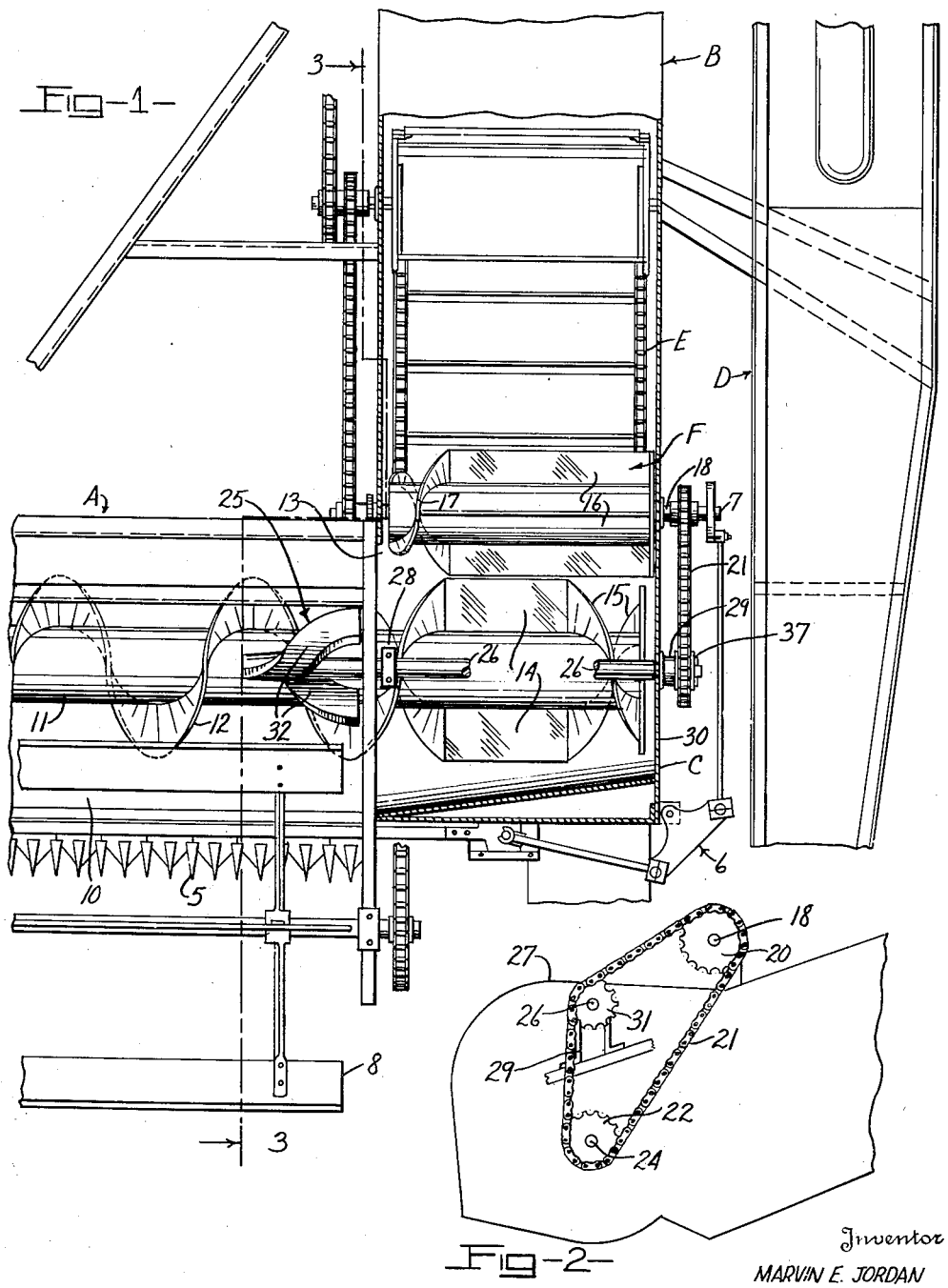
Inventor
MARVIN E. JORDAN Dec. 23, 1941.        M. E. JORDAN              2,266,764
                         COMBINE
              Filed May 6, 1940           2 Sheets-Sheet 2
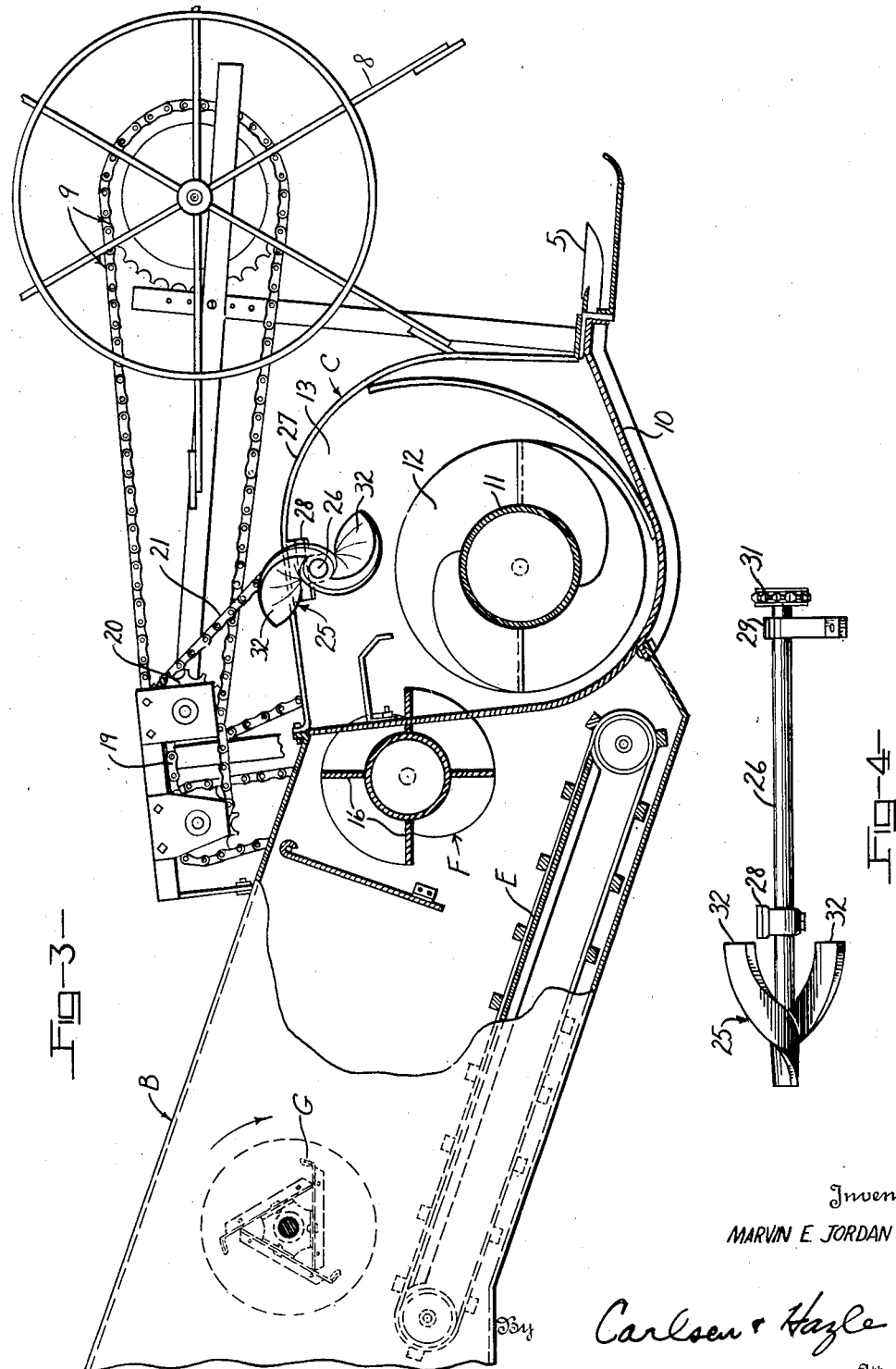
Inventor
MARVIN E. JORDAN
By Carlsen & Hazle
Attorneys Patented Dec. 23, 1941

2,266,764

UNITED STATES PATENT OFFICE 2,266,764

COMBINE

Marvin E. Jordan, Glasco, Kans., assignor to Minneapolis-Moline Power Implement Company, Minneapolis, Minn., a corporation of Delaware Application May 6, 1940, Serial No. 333,503

4 Claims. (Cl. 198—213)

This invention relates generally to improvements in combines as used in the harvesting and threshing of grain crops of various kinds. The invention more particularly contemplates improvements in the feeding means for such implements by which the cut crop is conveyed from the harvesting portion of the implement and fed to the threshing portion thereof.

In the type of implement here in mind, the cutting or harvesting mechanism deposits the cut grain on a screw conveyor or main feed auger by which the grain is fed endwise through the feed opening of a feeder housing carried at the forward portion of the implement. The grain thus carried into the feeder housing is deposited upon a separator conveyor whereby it is transferred to the threshing elements of the machine.

It has been found in practice that under certain circumstances, such as when weedy grain is encountered or when tall grain is being cut close to the ground, the grain has a tendency to build up or bunch over the feed auger at the mouth of the feed opening and prevent the proper feeding of the grain into the feeder housing. It is the primary object of my invention to provide an auxiliary feeding device which may be arranged over the main feed auger adjacent the feed opening in position to engage the grain should it bunch up at this point and feed the grain into the feeder housing to thus prevent clogging or jamming of the grain at this point. A further object of my invention is to provide a device of this kind which may be readily applied to the combine without major alterations thereof and which may be readily power driven by one of the operating sprocket chains on the combine.

These and other more detailed and specific objects will be disclosed in the course of the following specification, reference being had to the accompanying drawings, in which—

Fig. 1 is a plan view of a forward portion of a combine embodying my invention with fractional parts broken away and others shown in section in order to better illustrate the construction and mounting of my feed device.

Fig. 2 is a fragmentary side elevation of a forward portion of the feeder housing showing the driving means for my feed device.

Fig. 3 is a longitudinal, vertical sectional view taken substantially along the line 3—3 in Fig. 1 but showing my feed device in end elevation.

Fig. 4 is an elevation of my feed device alone and as removed entirely from the feeder housing of the combine.

The combine, per se, as illustrated in the attached drawings is of the type fully shown and described in the Martin Ronning U. S. Patent No. 1,959,689 granted May 22, 1934, for combines and the specific grain feeding mechanism is identical with that disclosed in the Alfred Korsmo and Martin Ronning U. S. Patent Reissue No. 21,161 issued July 25, 1939. Reference may be had to these prior patents for more complete disclosure of the combine and feeding structures and their operation. The particular combine and feeding structure shown herein are, however, for purposes of exemplification only, and it is to be understood that my improved feeding device may be used as well with any other suitable types of machines.

Referring now with more particularity to the drawings, the reference character A designates generally the harvesting mechanism, B the separator mechanism and C the feeder housing into which the cut grain is fed laterally from the harvesting mechanism and from which the grain is transferred rearwardly into the separator mechanism. The harvesting mechanism A includes the sickle or cutter 5 for heading the grain as the machine moves forwardly over the field and it is of course to be understood that the machine includes a suitable wheel borne framework as represented at D by which it is transported over the field. The cutter 5 is reciprocated by a pitman mechanism 6 from a transverse shaft 7 which is power driven from some operating part of the combine. A reel 8 is supported forwardly and above the cutter and is operated by a sprocket chain mechanism 9 to guide the standing grain into the sickle and thereafter to move the cut grain rearwardly upon a receiving platform 10. Operating on a transverse axis in the trough shaped lower and rear portion of the platform 10, is a main feed auger or screw conveyor 11 which has the spiral vane 12 arranged to carry the grain endwise along the platform and finally feed the cut grain through the feed opening 13 into the feeder housing C. Within the feeder housing C the feed auger 11 has blades 14 and reversely turned vanes 15 in accordance with the disclosure of Reissue Patent No. 21,161 hereinbefore noted, and the purpose of which structure is to deposit the cut grain upon the separator conveyor represented generally at E. This conveyor E is of the raddle type and operates to convey the grain upwardly and rearwardly toward the threshing elements of the combine.

It is of course well known that for best results, the cut grain must be distributed evenly and properly laid on the conveyor E, and for this purpose it is subjected to the action of two rotary feeder and beater devices represented generally at F and G. The first of these includes beater blades 16 which terminate at the end in helical extensions or vanes 17 and operates very effectively for this purpose as has been pointed out in the aforesaid re-issue patent. A shaft 18 forms a part of the operating mechanism and is driven at one end by a sprocket chain 19. At the opposite end, the shaft 18 carries a sprocket 20 and a chain 21 is trained over this sprocket and over a similar sprocket 22 on the feed auger shaft 24 to thus drive the main feed auger 11.

The foregoing structure has been found to operate extremely effectively under what might be termed normal conditions. However, when extremely heavy grain or weedy grain is encountered, there has been found to be a tendency of this grain to build up over the feed auger 11 at the point where it enters the feed opening 13 of the feeder housing C. This has resulted in clogging and stoppage at this point requiring frequent attention on the part of the operator and otherwise hindering the operation. The same result has been found to occur when the grain is tall and it is being cut close to the ground so that the cut stalks handled are of a greater than usual length.

In accordance with my invention I provide what might be termed an auxiliary feed device which is represented generally by the reference character 25. This device comprises a supporting shaft or axle on a transverse axis across the feeder housing C above and parallel with the feed auger 11. In the present structure this shaft 26 may be arranged immediately below the cover or top 27 of this feeder housing C and may be supported therefrom by a bearing 28 bolted in an inverted position within the housing adjacent the feed opening and by an outer bearing 29 bolted to the inner (with respect to the machine as a whole) end 30 of the housing. The inner end of the shaft 26 is then provided with a sprocket 31 over which the aforesaid chain 21 may be trained as clearly represented in Fig. 2. It is thus possible by the use of a single chain to drive both the feed auger 11, and my auxiliary feeding device 25, the direction of rotation being the same in both cases.

The length of the shaft 26 is such that it may extend at its outer end from the feeder housing C over that portion of the feed auger 11 which operates immediately outside the feed opening 13. Upon this extended end of the shaft is rigidly mounted the screw device including one or more spirally curved blades or vanes 32. The dimensions of these blades 32 are such that they will just clear the feed auger 11 and their pitch and spiral direction is such that they will have a tendency to feed any material with which they come in contact endwise in the same direction as that in which the feed auger 11 moves the material.

In operation, any grain which may have a tendency to build up above the feed auger 11 due to unusual bulk or length will encounter the rotating screw device or blades 32 which, operating in conjunction with the feed auger 11, will forcibly and positively carry the grain on through the feed opening 13 and into the feeder housing C. Once within this housing C the grain will be straightened out and properly deposited upon the separator conveyor E by action of the feed auger and device F as will be fairly apparent.

The action of the auxiliary feed device may be described as a combination of a beating and screw feeding action, the spiral blades acting both to transfer the grain endwise of themselves and also to beat the grain down to clear the upper margin of the feed opening. The feed device thus constitutes what might be termed a combination feeder and beater device as will be readily understood.

It will thus be seen that by my invention I have provided a simple and extremely effective device by means of which any jamming and clogging of the grain over the feed auger at the entrance into the feeder housing C will be positively prevented and it will be further evident that my device is capable of being conveniently arranged and mounted upon the combine without any material alterations thereof.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. In a combine, means for feeding grain from the harvesting mechanism to the threshing mechanism, said threshing mechanism including a feeder housing having a feed opening in one side, said feeding means including a feed screw operatively arranged to move the cut grain through the said feed opening, and an auxiliary feed device supported over the feed screw immediately outwardly of the feed opening and substantially below the upper margin of said opening, the said device being operative to engage and feed grain through the said opening.

2. An auxiliary grain feeding device for a combine having a main feed auger for feeding the grain through a feed opening in one upright side portion of the combine, the said device comprising a spiral blade located over the feed auger, and means rotatably supporting the blade for rotation about an axis located substantially below the plane of the upper margin of said feed opening whereby said blade will act upon grain protruding above the feed auger and urge such grain through the feed opening.

3. An auxiliary grain feeding device for a combine having a feed opening and a main auger adapted to feed grain inwardly through a lower portion of the opening, said device comprising a rotatable shaft extending outwardly from the opening over the auger, and a pair of spiral blades connected at outer ends to the shaft and spirally diverging from the shaft in an inward direction toward the feed opening.

4. An auxiliary grain feeding device for a combine having a feed opening and a main auger adapted to feed grain inwardly through a lower portion of the opening, said device comprising a rotatable shaft extending outwardly from the opening over the auger, and a pair of spiral blades connected at outer ends to the shaft and spirally diverging from the shaft in an inward direction toward the feed opening, and the said blades at their inner ends being spaced radially clear of the shaft to thereby feed grain endwise into and through the feed opening.

MARVIN E. JORDAN.